(12) United States Patent
Leibbrandt et al.

(10) Patent No.: US 7,464,616 B2
(45) Date of Patent: Dec. 16, 2008

(54) HYBRID TWIN-CLUTCH TRANSMISSION

(75) Inventors: Martin Leibbrandt, Bedburg (DE);
Ulrich Eggert, Viersen (DE); Christian Krauss, Köln (DE)

(73) Assignee: Getrag Ford Transmissions GmbH, Cologne (DE)

( * ) Notice: Subject to any disclaimer, the term of this patent is extended or adjusted under 35 U.S.C. 154(b) by 251 days.

(21) Appl. No.: 11/406,706

(22) Filed: Apr. 19, 2006

(65) Prior Publication Data

US 2006/0230855 A1  Oct. 19, 2006

(30) Foreign Application Priority Data

Apr. 19, 2005  (EP)  ................... 05103118

(51) Int. Cl.
*F16H 3/08*  (2006.01)

(52) U.S. Cl. ...................................... 74/331

(58) Field of Classification Search ............... 74/331, 74/661
See application file for complete search history.

(56) References Cited

U.S. PATENT DOCUMENTS

| | | | |
|---|---|---|---|
| 6,427,547 B1 * | 8/2002 | Bowen | ............... 74/329 |
| 6,427,549 B1 * | 8/2002 | Bowen | ............... 74/331 |
| 6,490,945 B2 | 12/2002 | Bowen | |
| 6,499,370 B2 * | 12/2002 | Bowen | ............... 74/330 |
| 6,506,139 B2 | 1/2003 | Hirt et al. | |
| 6,634,247 B2 | 10/2003 | Pels et al. | |
| 7,249,537 B2 | 7/2007 | Lee et al. | |
| 2002/0088288 A1 | 7/2002 | Bowen | |
| 2002/0088290 A1 | 7/2002 | Bowen | |
| 2002/0088291 A1 | 7/2002 | Bowen | |
| 2006/0230853 A1* | 10/2006 | Krauss et al. | ............... 74/325 |

FOREIGN PATENT DOCUMENTS

| | | |
|---|---|---|
| DE | 198 50 549 | 5/2000 |
| DE | 101 60 884 | 6/2003 |

OTHER PUBLICATIONS

Office Action issued by the United States Patent and Trademark Office for U.S. Appl. No. 11/406,580, dated Jan. 9, 2008.
Response filed Jun. 9, 2008 to the Office Action issued by the United States Patent and Trademark Office for U.S. Appl. No. 11/406,580, dated Jan. 9, 2008.

* cited by examiner

*Primary Examiner*—Dirk Wright
(74) *Attorney, Agent, or Firm*—Schlee IP International, P.C.; Alexander R. Schlee

(57) ABSTRACT

The invention relates to a twin-clutch transmission, in particular for a motor vehicle, comprising: a twin-clutch arrangement with clutches, input shafts, at least one output shaft, a number of gearwheel pairs and drive units. The first drive unit is connected to the input side of the twin-clutch arrangement and the second drive unit is connected to one of the input shafts or to the output shaft. The invention relates also to a methods for controlling the twin-clutch transmission, for example with the steps of disengaging the first clutch and the second clutch if these are engaged, and starting the engine by means of the first drive unit.

23 Claims, 2 Drawing Sheets

HYBRID TWIN-CLUTCH TRANSMISSION

This application claims the priority of the European Patent Application EP 05103118.5 having a filing date of Apr. 19, 2005, the entire content of which is herewith incorporated by reference.

BACKGROUND OF THE INVENTION

The invention relates to a hybrid twin-clutch transmission and to a method for controlling this transmission.

A hybrid twin-clutch transmission for a motor vehicle is disclosed in DE 198 50 549 A1, for example. The twin-clutch transmission comprises a twin-clutch arrangement with a first clutch and a second clutch and also with an input side for connecting the twin-clutch arrangement to an engine. The twin-clutch transmission furthermore comprises a first input shaft and a second input shaft which are arranged on an output side of the twin-clutch arrangement.

The twin-clutch transmission of DE 198 50 549 A1 can be connected to an output drive by means of an output shaft. For connecting the first or the second input shaft to the output shaft, a number of gearwheel pairs are provided, by means of which a torque can be transmitted between one of the input shafts and the output shaft when a gear-shifting clutch assigned to the gearwheel pair concerned is closed. The twin-clutch transmission furthermore comprises a first electric machine and a second electric machine which are connected to the first input shaft and to the second input shaft respectively. These electric machines can perform very different functions, such as synchronizing the rotational speed of one of the input shafts with the rotational speed of the output shaft, for example.

DE 198 50 549 A1 proposes using one or both of the electric machines for starting the engine in order consequently to dispense with the otherwise usual starter. If both electric machines are to be used, both clutches must therefore be closed for transmitting a starting torque to the crankshaft of the engine.

However, hydraulically actuated clutches are also used in twin-clutch transmissions. In this connection, the clutches can be designed in such a way that a certain hydraulic pressure must be applied for closing them. However, if the hydraulic pressure is built up with the aid of the internal combustion engine, the clutches cannot be used for starting the (still idle) engine. The arrangement disclosed in DE 198 50 549 A1 of the electric machines cannot therefore be used for starting with all possible clutch types.

SUMMARY OF THE INVENTION

The invention is therefore based on the object of providing a twin-clutch transmission with a first drive unit and with a second drive unit which allows as many applications as possible of these drive units with any clutch types.

The object forming the basis of the invention is achieved by means of the twin-clutch transmission with the features of claim 1. Preferred illustrative embodiments can be inferred from the subclaims.

The twin-clutch transmission according to the invention is characterized in that the first drive unit is connected to the input side of the twin-clutch arrangement and in that the second drive unit is connected to one of the input shafts and the at least one output shaft. This means that, as far as the transmission is concerned, the first drive unit is arranged between the engine and the twin-clutch arrangement. By means of such an arrangement, the first drive unit can start the engine even when the two clutches are open. It is consequently also possible to use hydraulically actuated clutches in which a hydraulic pressure usually built up with the aid of the engine is required for closing the clutches. A further advantage of the arrangement is that the first drive unit can be used as an additional centrifugal mass for the engine, by virtue of which the rotary moment of inertia of the engine can be reduced. Advantageously, the first drive unit can then also damp tensional vibrations from the engine or stabilize the idling of the engine at low rotational speeds and with the clutches open.

The second drive unit is preferably connected to one of the input shafts. If, for example, this second drive unit is to be used for driving the output shaft, the transmission ratios which are defined between one of the input shafts and the output shaft by the engageable gearwheel pairs can thus be used. The second drive unit can, for example, be arranged coaxially with the input shaft, mesh with a gearwheel located on the input shaft or be connected to the input shaft by a closed pulling means such as a chain, for example.

At least one drive unit comprises an electric machine which can be operated both as an electric motor and as a generator. For example, both drive units can comprise electric machines which are used simultaneously as an electric motor or simultaneously as a generator. It is also possible for one drive unit to be operated as a motor while the other drive unit is used as a generator. The drive units can consequently be controlled independently of one another.

In a preferred illustrative embodiment, at least the second drive unit can deliver a torque in two opposite directions of rotation. The second drive unit can thus on the one hand be used to accelerate the input shaft connected to it for the purpose of engaging gear-shifting clutches. On the other hand, reversing of the vehicle can be effected by means of the drive unit, a gearwheel pair which usually forms a forward gear being selected for transmitting the torque. As a result, it is possible to dispense with a separate reverse gear in the twin-clutch transmission.

The first drive unit can preferably be arranged coaxially with the twin-clutch arrangement. In this connection, the drive unit can surround the twin-clutch arrangement at least partially in the radial direction, so that the overall axial length of the twin-clutch transmission is not influenced or is influenced only to a small extent. The drive unit can then be accommodated in a clutch housing of the twin-clutch arrangement.

Preferably, a first part transmission with odd forward gears is assigned to the first input shaft, and a second part transmission with even forward gears is assigned to the second input shaft. Such a division of the gears makes shifting between adjacent gears possible without attractive-force interruption.

In a preferred illustrative embodiment, the first drive unit and the second drive unit are connected to a battery. The battery can thus be fed with energy, for example, which originates from a drive unit operated as a generator, while at the same time or with a delay it supplies energy to the other drive unit which then, operated as a motor, requires energy. The two drive units can also be directly interconnected, one drive unit working as a generator and the second drive unit as a motor.

In an illustrative embodiment, the power of the first drive unit lies between 10 and 40 kW and is preferably roughly 25 kW. Allowing for losses, such a power enables a vehicle in which the twin-clutch transmission is installed to be accelerated from standing or moved backward sufficiently rapidly.

A preferred method for controlling the twin-clutch transmission according to the invention is characterized in that, when the engine is started, the first clutch and the second clutch are opened if they are in a closed state. The engine is then started by the first drive unit.

An alternative method for starting the engine proposes that the engine is started by the first drive unit and the second drive unit simultaneously. By virtue of this, a higher power is available for starting the engine, which is advantageous especially when cold-starting the engine owing to the drag torques which are then increased. Moreover, simultaneous use of the drive units for starting the engine allows the first drive unit to be made smaller.

In order for it to be possible to use the second drive unit as well during starting of the engine, all the gear-shifting clutches of the gearwheel pairs assigned to the second part transmission must be opened. By virtue of this, the second input shaft can be driven by the second drive unit even if the at least one output shaft is not rotating owing to the motor vehicle being at a standstill. For transmitting the torque from the second drive unit to the engine via the second input shaft, the second clutch is closed. The first drive unit and the second unit are consequently in engagement with the engine. Starting of the engine by both drive units can take place.

Following the starting of the engine, the idling can also be stabilized by the first drive unit with the clutches open. By virtue of this, markedly smaller idling rotational speeds are possible than in unstabilized operation.

According to torque requirement, the motor vehicle can be accelerated either with the second drive unit or with one of the clutches or with both. In this connection, the first drive unit on the input side of the twin-clutch arrangement can also act supportingly.

In a case where the engine is not yet running (in order to save energy for example), the motor vehicle can be moved by the second drive unit, while the engine is started by the drive unit on the input side of the twin-clutch arrangement. Following the connection of the engine, it can be supported simultaneously by both drive units during driving off. This method allows a start/stop strategy to be implemented without the otherwise usual delays during driving off.

The transmission can be shifted like an ordinary twin-clutch transmission (not equipped with drive units) without attractive-force interruption. In addition, the shifting operation can be supported by the drive units by, for example, the second drive unit being used to replenish the torque during shifting. Alternatively or additionally, the first drive unit on the input side of the twin-clutch arrangement can contribute to adapting the rotational speed of the engine to the input shaft rotational speed. The second drive unit on the second input shaft can also be used for synchronizing the gear rotational speeds, by virtue of which the gear-shifting clutches in this part transmission can be designed as simple dog clutches.

BRIEF DESCRIPTION OF THE DRAWINGS

The invention is to be explained in greater detail with reference to the illustrative embodiments shown in the figures, in which.

DETAILED DESCRIPTION OF THE DRAWINGS

Figure 1:
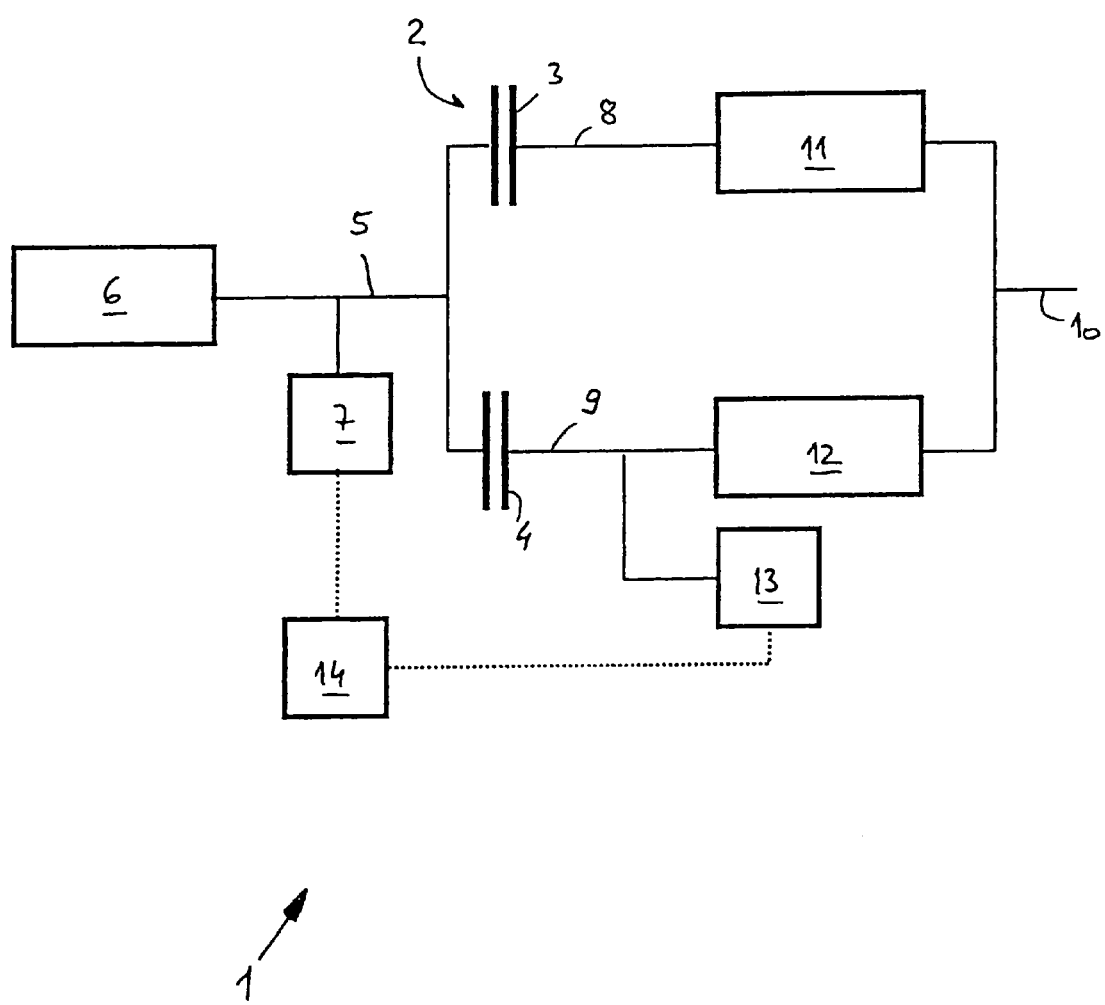
FIG. 1 shows a drive diagram of an illustrative embodiment.

FIG. 1 shows a drive diagram of a twin-clutch transmission, which is designated as a whole by 1 and can be used as an automated gearbox in a motor vehicle, for example. A twin-clutch arrangement 2 comprises a first clutch 3 and a second clutch 4. An engine 6 is connected to an input side 5 of the twin-clutch arrangement 2. A first drive unit 7 is provided between the engine 6 and the twin-clutch arrangement 2. The first drive unit 7 is accordingly connected to the input side 5 of the twin-clutch arrangement 2, so that a torque of the first drive unit 7 can be transmitted to the input side 5 of the twin-clutch arrangement 2.

A first input shaft 8 is assigned to the first clutch 3. When the first clutch 3 is closed, a torque of the engine and/or of the first drive unit 7 is consequently transmitted to the first input shaft 8. Correspondingly, torque transmission takes place from the engine 6 or from the first drive unit to a second input shaft 9 when the second clutch 4 assigned to the second input shaft 9 is closed.

A first part transmission 11, by means of which various transmission ratios can be brought about between input shaft 8 and output drive 10, is arranged between the first input shaft 8 and an output drive 10. In this connection, a transmission ratio is brought about by a gearwheel pair with a loose wheel and a fixed wheel. A gear-shifting clutch is assigned to each loose wheel. If the gear-shifting clutch of a loose wheel is closed, the gearwheel pair concerned transmits a torque between the first input shaft 8 and the output drive 10.

Further transmission ratios are made possible by a second part transmission 12 which is provided between the second input shaft 9 and the output drive 10 and, similarly to the first part transmission 11, has a number of gearwheel pairs with gear-shifting clutches.

A second drive unit 13 is in engagement with the second input shaft 9. In this connection, the second drive unit 13 is, seen from the input side 5, arranged behind the second clutch 4. Drive unit 13 and engine 6 are consequently separated from one another by an open clutch 4.

A battery 14 connects the first drive unit 7 to the second drive unit 13. The first and second drive units 7, 13 each comprise an electric machine, which machines can both be used as an electric motor or as a generator. The battery then makes it possible to forward, receive, store and deliver electrical energy generated or required by the drive units 7, 13.

The method for operating the twin-clutch transmission 1 is described with reference to a few selected driving states.

If the engine 6 is idle, it can be accelerated to its starting rotational speed by the first drive unit 7. In this connection, at least the first clutch 3 is open, so that the first part transmission 11 is separated from the input side 5 of the twin-clutch arrangement 2. To support the first drive unit 7, the second drive unit 13 can be used for starting the engine 6. In this case, the second clutch 4 is closed in order that the torque of the second drive unit 13 can be transmitted to the engine 6 via the second input shaft 9. In order that rotation of the second input shaft 9 is also possible with the vehicle stationary, or the output drive 10 idle, the gear-shifting clutches assigned to the second part transmission must be open. In this case, no torque is transmitted between the second input shaft 9 and the output drive.

When the engine 6 is being started, the first clutch 3 does not necessarily have to be open. It is also possible to achieve the necessary separation between the idle output drive 10 and the then co rotating input shaft 8 by virtue of all the gear-shifting clutches assigned to the first part transmission 11 being open. In comparison with an open first clutch 3, however, this has the disadvantage that, when the engine 6 is started, a certain amount of the power of the first drive unit 7 and of the second drive unit 13 is consumed for rotating the first input shaft 8.

After the engine 6 has been started, the idling can also be stabilized with the clutches 3 and 4 open by activating the first drive unit 7; the drive unit 7 is activated in such a way that it counteracts the periodic torque fluctuations of the engine 6 and consequently sets the rotational speed of the engine 6 to a designated value.

The motor vehicle equipped with the twin-clutch transmission 1 can be driven off in various ways. For example, with the first clutch 3 open and with the second clutch 4 open, driving off can take place only via the second drive unit 13 and via the second part transmission 12. In this connection, the engine 6, which is idle for reasons of energy saving, for example, can be accelerated to its starting rotational speed and started by the first drive unit 7. The second clutch 4 can then be closed, by virtue of which the torque of the engine 6, of the first drive unit 7 and of the second drive unit 13 can then be used for further acceleration of the vehicle.

Alternatively, it is also possible to use the first clutch 3 as a starting clutch by means of which the torque of the engine 6 and if appropriate of the first drive unit 7 is conveyed to the output drive 10 via the first input shaft and via the part transmission 11. Owing to uncoupling brought about by the open second clutch 4, the rotational speed of the second input shaft 9 can, taking account of the selected ratio in the second part transmission 12, be selected in such a way that simultaneous driving of the output drive is possible, the rotational speeds of the two input shafts then being different.

The vehicle can be moved at very low speed (driven in creep mode) by means of the second drive unit 13. This minimizes the thermal loading of the clutch which is otherwise used for driving-off. As already described above, both the first clutch 3 and the second clutch 4 can be used for driving the motor vehicle off.

The motor vehicle can likewise be reversed with the aid of the second drive unit 13. The second drive unit 13 then rotates in an opposite direction of rotation, so that, with a forward gear engaged in the second part transmission 12, an opposite direction of rotation of the output drive 10 is brought about. The energy the second drive unit 13 requires when reversing the motor vehicle can be generated by the first drive unit 7 and conveyed to the second drive unit 13 via the battery 14.

Stopping the motor vehicle on a hill can be effected either via the clutches 3, 4 or via the second drive unit on the second input shaft 9.

Part of the kinetic energy stored in the vehicle can be recovered during braking by means of the drive units 7, 13, which preferably each comprise an electric machine. This energy can be fed into a short-term store (not illustrated) or into the battery 14 in order to support the engine in the next acceleration phase. In this connection, use can be made of only the second drive unit 13 on the second input shaft 9 during braking, while the engine 6 is stopped with the first drive unit 7 with the clutches 3, 4 open. With an increased requirement for braking torque, the motor vehicle can also be slowed down additionally with the drag torque of the engine 6 or additionally also by the first drive unit 7.

In this connection, the transition from one operating state into the other can take place smoothly by virtue of the engine 6 being dragged along by the closing of a clutch 3, 4. Here, the first drive unit 7 can be used with minimum use of energy (or even energy recovery) for damping the drive train vibrations which arise in the process and thus making quiet engine starting possible.

Figure 2:
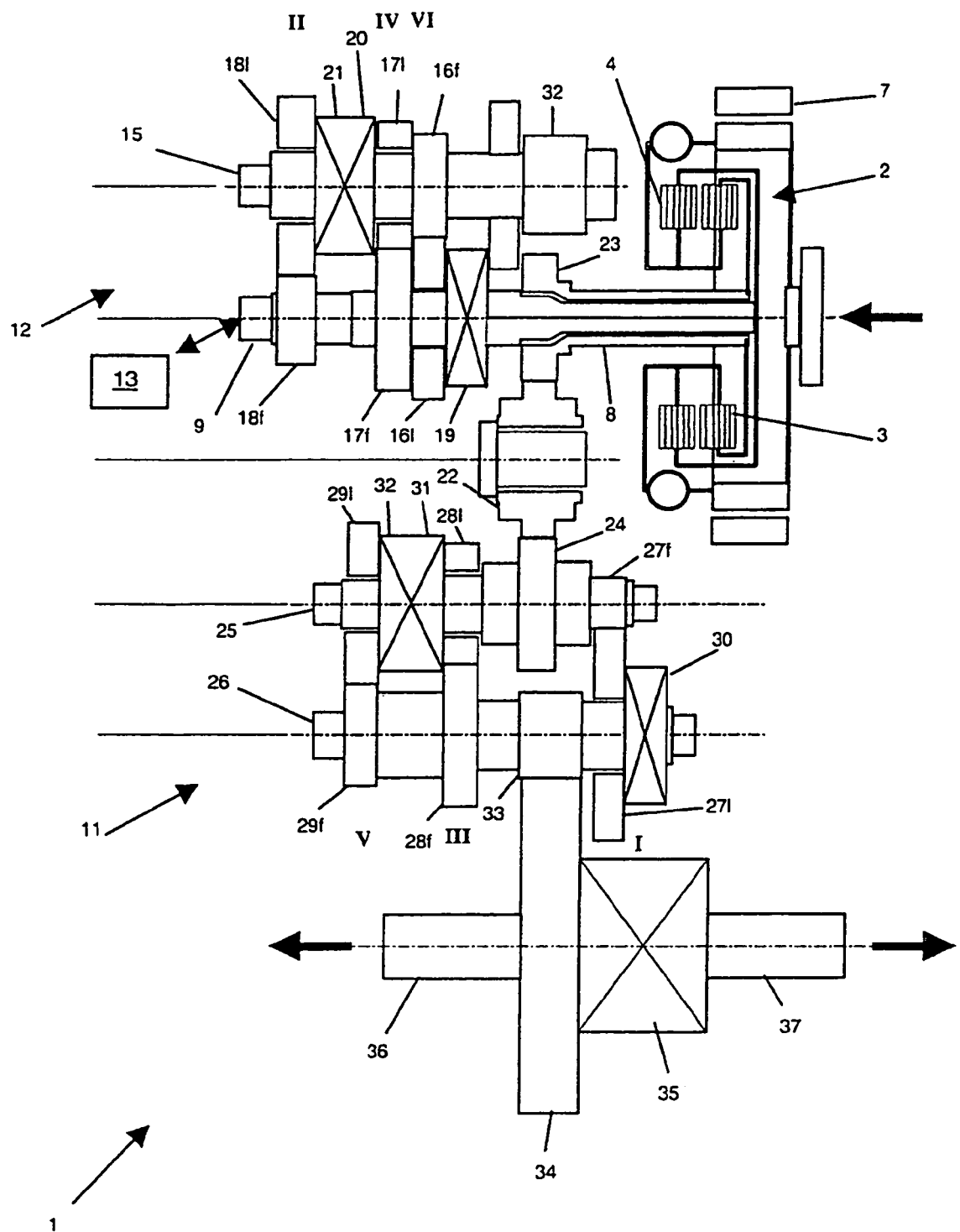
FIG. 2 shows a twin-clutch transmission as a 6-gear transmission.

FIG. 2 shows an illustrative embodiment of the invention with 6 forward gears I, II . . . VI. In FIG. 2, components which are identical or comparable with the components described in FIG. 1 are provided with the same reference numbers. As can be seen, the first input shaft 8 and the second input shaft 9 are arranged coaxially with one another, the first input shaft 8 being designed as a hollow shaft.

The second part transmission 12 assigned to the second input shaft 9 has an output shaft 15 and three gearwheel pairs 16, 17, 18. In this connection, each gearwheel pair comprises a fixed wheel 16f, 17f, 18f and a loose wheel 16l, 17l, 18l. Loose wheels 17l, 18l are arranged on the output shaft 15, while loose wheel 16l is located on the second input shaft 9. The respective loose wheels can be connected in a rotationally fixed manner to the shaft bearing them by means of gear-shifting clutches 19, 20, 21 assigned to the individual loose wheels. The gear-shifting clutches 19, 20, 21 are here illustrated only very diagrammatically as rectangles with diagonals drawn in.

The first part transmission 11 is separated spatially from the second part transmission 12 by an intermediate gearwheel 22. This intermediate gearwheel 22 meshes with a gearwheel 23 which is connected to the first input shaft 8 in a rotationally fixed manner. The intermediate gearwheel 22 meshes furthermore with a gearwheel 24 on an intermediate shaft 25. The gearwheel 24 is connected to the intermediate shaft 25 in a rotationally fixed manner. Torque transmission from the intermediate shaft 25 to a further output shaft 26 can take place via three gearwheel pairs 27, 28, 29. As in the second part transmission 12 as well, each gearwheel pair 27, 28, 29 has a loose wheel 27l, 28l, 29l and a fixed wheel 27f, 28f, 29f. A gear-shifting clutch 30 is provided in order to connect the loose wheel 27l to the output shaft 26 in a rotationally fixed manner. Gear-shifting clutches 31 and 32 ensure a more rotationally fixed connection of the loose wheels 28l, 29l to the intermediate shaft 25.

A gearwheel 32, 33 which meshes with a large gearwheel or ring gearwheel 34 is in each case located in a rotationally fixed manner on the output shafts 15, 26. The large gearwheel 34 drives a differential 35 which distributes the applied torque to the axles 36, 37.

The first drive unit 7 is arranged coaxially with the input shafts 8, 9 and surrounds the twin-clutch arrangement 2 in the radial direction. The second drive unit 13 is functionally connected to the second input shaft 9 and can be connected to the second input shaft 9 with a chain or the like (not illustrated), for example. The connection is only indicated here by a double arrow. Alternatively, the drive unit 13 can also be connected to the second input shaft 9 by a spur wheel stage. A gearwheel of the spur wheel stage can be a fixed wheel of the input shaft 9 or a loose wheel functionally connected to the input shaft 9.

A forward gear is brought about by each gearwheel pair 16, 17, 18, 27, 28, 29, a forward gear in each case being designated by a Roman numeral. For example, the second forward gear II is engaged when the gear-shifting clutch 21 is closed and the gearwheel pair 18, consisting of the fixed wheel 18f and the loose wheel 18l, can then transmit a torque between the shafts 9, 15.

The method for controlling the twin-clutch transmission 1 according to the invention is also to be explained here, again by means of a few driving states.

If the first forward gear I is engaged, for example, the gear-shifting clutch 30 is in a closed state, by virtue of which the loose wheel 27l is connected to the output shaft 26 in a rotationally fixed manner. In order to drive off in first forward gear I now, the first clutch 3 is closed, the torque of the engine 6 and if appropriate the torque of the first drive unit 7 being conveyed to the first input shaft 8. Via the gearwheel 23, the intermediate gearwheel 22 and the intermediate shaft 25 with the gearwheel 24, the torque is conveyed to the fixed wheel 27f which meshes with the loose wheel 27l. Owing to the closed gear-shifting clutch 30, the torque is transmitted via the output shaft 26 to the gearwheel 33 and consequently in the end via the gearwheel 34 and the differential 35 to the axles 36, 37. Alternatively, the input shaft 25 can be acted on with torque by the drive unit 13 with the clutch 3 open, the torque then being conveyed via the fixed wheel 27f which meshes with the loose wheel 27l. Via the closed gear-shifting clutch 30, the torque is then transmitted via the output shaft 26 to the gearwheel 33 and consequently again via the gearwheel 34 and the differential 35 to the axles 36 and 37. In this connection, the energy necessary for generating the torque of the drive machine 13 can be drawn either from the battery 14 or from the drive unit 7, and the drive unit 7 can be driven by the engine 6.

In order then, for example, to shift from the second to the third forward gear, the gear-shifting clutch 31 is closed with the clutch 3 open and with the clutch 4 remaining closed. In order for it to be possible to close the gear-shifting clutch 31, the rotational speed of the input shaft 25 must be synchronized to the rotational speed of the output shaft. This can be effected via conventional synchronization units or (exclusively) via the second drive unit 13.

Once the third gear is engaged, the second clutch 4 can be opened and the first clutch 3 closed in an overlapping manner. In this connection, the second drive unit can apply at least in part the torque required on the output shaft 26. The first drive unit 7 can also be used to adapt the rotational speeds of engine 6 and second input shaft 25 to one another more rapidly in the overlapping phase of the two clutches.

The second drive unit 13 can also already provide torque even with the first clutch 3 open, which supports acceleration of the vehicle via the engine 6 with the second forward gear II.

LIST OF REFERENCE NUMBERS 1 twin-clutch transmission
2 twin-clutch arrangement
3 first clutch
4 second clutch
5 input side
6 engine
7 first drive unit
8 first input shaft
9 second input shaft
10 output drive
11 first part transmission
12 second part transmission
13 second drive unit
14 battery
15 output shaft
16 gearwheel pair
17 gearwheel pair
18 gearwheel pair
19 gear-shifting clutch
20 gear-shifting clutch
21 gear-shifting clutch
22 intermediate gearwheel
23 gearwheel
24 gearwheel
25 intermediate shaft
26 output shaft
27 gearwheel pair
28 gearwheel pair
29 gearwheel pair
30 gear-shifting clutch
31 gear-shifting clutch
32 gearwheel
33 gearwheel
34 large gearwheel
35 differential
36 axle
37 axle

The invention claimed is:

1. A twin-clutch transmission, in particular for a motor vehicle, comprising:
   a twin-clutch arrangement with a first clutch and a second clutch and with an input side for connecting the twin-clutch arrangement to an engine;
   a first input shaft and a second input shaft, the first input shaft being connectable to the engine via the first clutch and the second input shaft being connectable to the engine via the second clutch;
   at least one output shaft;
   a number of gearwheel pairs for connecting the input shafts to the at least one output shaft;
   at least one gear-shifting clutch assigned to at least one of the gearwheel pairs, wherein a torque being transmittable between one of the input shafts and the at least one output shaft by the at least one of the gearwheel pairs when the gear-shifting clutch assigned to this gearwheel pair is closed, and
   at least a first drive unit and a second drive unit, wherein
   the first drive unit is connected to the input side of the twin-clutch arrangement and the second drive unit is connected to one of the input shafts or to the at least one output shaft; and
   the first drive unit is arranged coaxially with the twin-clutch arrangement.

2. The twin-clutch transmission as claimed in claim 1, wherein at least one drive unit comprises an electric machine.

3. The twin-clutch transmission as claimed in claim 1, wherein the electric machine can be used as a motor and a generator.

4. The twin-clutch transmission as claimed in claim 1, wherein at least the second drive unit can deliver a torque in two opposite directions of rotation.

5. The twin-clutch transmission as claimed in claim 1, wherein the first drive unit surrounds the twin-clutch arrangement at least partially in the radial direction.

6. The twin-clutch transmission as claimed in claim 1, wherein a first part transmission with gearwheel pairs for odd forward gears is assigned to the first input shaft, and a second part transmission with gearwheel pairs for even forward gears is assigned to the second input shaft.

7. The twin-clutch transmission as claimed in claims 1, wherein the first drive unit and the second drive unit are connected to a battery.

8. The twin-clutch transmission as claimed in claims 1, wherein the power of the first drive unit lies between 15 and 35 kW and is preferably roughly 25 kW.

9. A method for controlling a twin-clutch transmission, in particular for a motor vehicle, comprising:
   a twin-clutch arrangement with a first clutch and a second clutch and with an input side for connecting the twin-clutch arrangement to an engine;
   a first input shaft and a second input shaft, the first input shaft being connectable to the engine via the first clutch and the second input shaft being connectable to the engine via the second clutch;
   at least one output shaft;
   a number of gearwheel pairs for connecting the input shafts to the at least one output shaft;
   at least one gear-shifting clutch assigned to at least one of the gearwheel pairs, wherein a torque being transmittable between one of the input shafts and the at least one output shaft by the at least one of the gearwheel pairs when the gear-shifting clutch assigned to this gearwheel pair is closed; and at least a first drive unit and a second drive unit;

wherein the first drive unit is connected to the input side of the twin-clutch arrangement and the second drive unit is connected to one of the input shafts or to the at least one output shaft; the method comprising following method steps:

disengaging the first clutch and the second clutch if these are engaged; and starting the engine by means of the first drive unit, wherein the engine is stabilized in idling operation by the first drive unit.

10. The method as claimed in one of claims 9, wherein the motor vehicle is accelerated from standing with one of the clutches and/or with the second drive unit.

11. The method as claimed in claim 10, wherein the first drive unit delivers a torque when the vehicle is accelerated from standing.

12. The method as claimed in claim 9, wherein, when shifting from a source gear assigned to the first input shaft to a target gear assigned to the second input shaft, the following method steps apply:

accelerating or braking the second input shaft to a synchronous rotational speed corresponding to the gear-shifting clutch assigned to the target gear;

engaging the gear-shifting clutch assigned to the target gear; and disengaging the first clutch and engaging the second clutch.

13. The method as claimed in claim 12, wherein the acceleration or braking of the second input shaft to the synchronous rotational speed is effected by the second drive unit.

14. The method as claimed in claim 12, wherein, after engaging the gear-shifting clutch assigned to the target gear, the second drive unit bears at least part of the torque the output shaft is subjected to.

15. The method as claimed of claim 12, wherein the first drive unit supports the adaptation of the rotational speed of the engine to the rotational speed of the second input shaft.

16. A method for controlling a twin-clutch transmission, in particular for a motor vehicle, comprising:

a twin-clutch arrangement with a first clutch and a second clutch and with an input side for connecting the twin-clutch arrangement to an engine;

a first input shaft and a second input shaft, the first input shaft being connectable to the engine via the first clutch and the second input shaft being connectable to the engine via the second clutch;

at least one output shaft;

a number of gearwheel pairs for connecting the input shafts to the at least one output shaft;

at least one gear-shifting clutch assigned to at least one of the gearwheel pairs, wherein a torque being transmittable between one of the input shafts and the at least one output shaft by the at least one of the gearwheel pairs when the gear-shifting clutch assigned to this gearwheel pair is closed; and at least a first drive unit and a second drive unit;

wherein the first drive unit is connected to the input side of the twin-clutch arrangement and the second drive unit is connected to one of the input shafts or to the at least one output shaft;

the method comprising following method steps:

disengaging all the gear-shifting clutches of the gearwheel pairs of the first or second part transmission connected to the second drive unit;

if disengaged, engaging the first or second clutch connected to the second drive unit, so that the associated part transmission is connected to the engine; and starting the engine by means of the first drive unit and the second drive unit.

17. The method as claimed in claim 16, wherein the engine is stabilized in idling operation by the first drive unit.

18. The method as claimed in claim 16, wherein the motor vehicle is accelerated from standing with one of the clutches and/or with the second drive unit.

19. The method as claimed in claim 18, wherein the first drive unit delivers a torque when the vehicle is accelerated from standing.

20. The method as claimed in claim 16, wherein, when shifting from a source gear assigned to the first input shaft to a target gear assigned to the second input shaft, the following method steps apply:

accelerating or braking the second input shaft to a synchronous rotational speed corresponding to the gear-shifting clutch assigned to the target gear;

engaging the gear-shifting clutch assigned to the target gear; and disengaging the first clutch and engaging the second clutch.

21. he method as claimed in claim 20, wherein the acceleration or braking of the second input shaft to the synchronous rotational speed is effected by the second drive unit.

22. The method as claimed in claim 20, wherein, after engaging the gear-shifting clutch assigned to the target gear, the second drive unit bears at least part of the torque the output shaft is subjected to.

23. The method as claimed of claim 20, wherein the first drive unit supports the adaptation of the rotational speed of the engine to the rotational speed of the second input shaft.

* * * * *

UNITED STATES PATENT AND TRADEMARK OFFICE
CERTIFICATE OF CORRECTION

PATENT NO. : 7,464,616 B2  Page 1 of 1
APPLICATION NO. : 11/406706
DATED : December 16, 2008
INVENTOR(S) : Martin Leibbrandt, Ulrich Eggert and Christain Krauss It is certified that error appears in the above-identified patent and that said Letters Patent is hereby corrected as shown below:

| Column | Line | | Should Read: |
|---|---|---|---|
| 2 | 51 | without attractive-force interruption. | --without tractive-force interruption.--. |
| 3 | 41 | without attractive-force interruption. | --without tractive-force interruption.--. |
| 10 | 43 | he method as claimed in claim 20, | --The method as claimed in claim 20,--. |

Signed and Sealed this

Seventeenth Day of February, 2009

JOHN DOLL
*Acting Director of the United States Patent and Trademark Office*